(12) United States Patent
Pan et al.

(10) Patent No.: US 8,808,925 B2
(45) Date of Patent: Aug. 19, 2014

(54) MICROPOROUS POLYMER MEMBRANE MODIFIED BY AQUEOUS POLYMER, MANUFACTURING METHOD AND USE THEREOF

(75) Inventors: Zhonglai Pan, Sichuan (CN); Zhenghua Den, Sichuan (CN); Rengui Li, Sichuan (CN); Lu Wang, Sichuan (CN); Kai Wang, Sichuan (CN); Jiamin Deng, Sichuan (CN); Hongchang Du, Sichuan (CN); Jiandong Gao, Sichuan (CN); Jishuan Suo, Sichuan (CN)

(73) Assignee: Changzhou Zhongke Laifang Power Development Co., Ltd., Ziangsu (CN)

( * ) Notice: Subject to any disclaimer, the term of this patent is extended or adjusted under 35 U.S.C. 154(b) by 570 days.

(21) Appl. No.: 13/129,697

(22) PCT Filed: Sep. 16, 2009

(86) PCT No.: PCT/CN2009/073955
§ 371 (c)(1),
(2), (4) Date: May 17, 2011

(87) PCT Pub. No.: WO2010/069189
PCT Pub. Date: Jun. 24, 2010

(65) Prior Publication Data
US 2011/0229768 A1    Sep. 22, 2011

(30) Foreign Application Priority Data

Dec. 19, 2008 (CN) .......................... 2008 1 0306377

(51) Int. Cl.
| H01M 10/02 | (2006.01) |
| B05D 7/04 | (2006.01) |
| C08J 5/22 | (2006.01) |
| H01G 9/00 | (2006.01) |
| H01G 9/02 | (2006.01) |
| H01M 2/16 | (2006.01) |

(52) U.S. Cl.
CPC ............ *H01M 2/1653* (2013.01); *C08J 5/2287* (2013.01); *C08J 2323/02* (2013.01); *H01G 9/155* (2013.01); *Y02E 60/13* (2013.01); *H01M 2/166* (2013.01); *H01G 9/02* (2013.01); *Y02E 60/12* (2013.01); *H01M 2/1686* (2013.01)
USPC .......................................... 429/309; 427/209

(58) Field of Classification Search
USPC .................. 429/309; 427/209, 535, 551, 553
See application file for complete search history.

(56) References Cited

U.S. PATENT DOCUMENTS

| 5,266,391 | A | 11/1993 | Donato et al. | |
| 2001/0021421 | A1* | 9/2001 | Witham et al. | ............... 427/491 |
| 2002/0110732 | A1 | 8/2002 | Coustier et al. | |
| 2003/0044611 | A1* | 3/2003 | Stark et al. | ................... 428/405 |
| 2004/0013716 | A1* | 1/2004 | Gale et al. | ..................... 424/449 |
| 2004/0241550 | A1 | 12/2004 | Wensley et al. | |
| 2012/0024787 | A1* | 2/2012 | Charkoudian et al. | ........ 210/650 |

FOREIGN PATENT DOCUMENTS

| CN | 1404170 A | 3/2003 |
| CN | 1574419 A | 2/2005 |
| CN | 101226994 A | 7/2008 |
| CN | 101250276 A | 8/2008 |
| JP | 1186752 A | 7/1989 |

OTHER PUBLICATIONS

International Search Report, PCT/CN2009/073955 (Dec. 24, 2009).

* cited by examiner

*Primary Examiner* — Mark F Huff
*Assistant Examiner* — Monique Wills
(74) *Attorney, Agent, or Firm* — Caesar, Rivise, Bernstein, Cohen & Pokotilow, Ltd.

(57) ABSTRACT

Microporous polyolefin membrane modified by aqueous polymer of the invention is obtained by the following steps: copolymerizing 100 parts of a water-soluble polymer, 30-500 parts of a hydrophobic monomer, 0-200 parts of a hydrophilic monomer and 1-5 parts of an initiator into polymeric colloid emulsion; adding 0-100% of an inorganic filler and 20-100% of a plasticizer based on 100% solid content of the polymeric colloid emulsion to obtain slurry; and coating the slurry on one or two surfaces of the surface modified microporous polyolefin membrane and then drying. The microporous polyolefin membrane modified by aqueous polymer has thermal shutdown effect and little thermal shrinkage, and improves the main problem of shrinkage of the microporous polyolefin membrane at high temperature.

20 Claims, No Drawings

MICROPOROUS POLYMER MEMBRANE MODIFIED BY AQUEOUS POLYMER, MANUFACTURING METHOD AND USE THEREOF

CROSS-REFERENCE TO RELATED APPLICATIONS

This application is based on International Application No. PCT/CN12009/073955 filed Sep. 16, 2009, which claims the benefit of Chinese Application No. 200810306377.4 filed Dec. 19, 2008, which are incorporated herein in their entireties.

FIELD OF THE INVENTION

The invention relates to a membrane material modified by an aqueous polymer and used for energy storage devices such as non-aqueous electrolyte batteries, and a preparation method and use thereof, which belongs to the field of manufacturing energy storage devices such as batteries, capacitors and so on.

DESCRIPTION OF THE RELATED ART

Microporous polymer membrane is one of the indispensable materials for manufacturing non-aqueous electrolyte energy storage devices, such as lithium-ion batteries, rechargeable lithium metal batteries and supercapacitors. The commercial membrane used by non-aqueous electrolyte energy storage devices is mainly microporous polyolefin membrane, microporous polyvinylidene fluoride membrane and microporous polyolefin/polyvinylidene fluoride composite membrane.

The microporous polyolefin membrane manufactured by mechanical two-way stretch method (dry method) and solvent extraction method (wet method) is mainly polyethylene membrane, polypropylene membrane and polyethylene-polypropylene composite membrane. As polyolefin is a non-polar material, the compatibility of polyolefin with electrolyte solution (polar organic solvent) is poor. It plays only the role of a mechanical isolation between anode and cathode. The membrane has no fixation to electrolyte, which makes most of the electrolyte solution exist in the battery in a free state. During charge-discharge cycles, redox side-reaction occurs inevitably between the free electrolyte with anode and cathode materials to consume the electrolyte in battery which results in poor liquid. It leads to polarizations increase of battery and it is easy to produce lithium dendrite formed by lithium deposition crystal in charge-discharge cycles and thereby results in membrane piercing phenomenon. Dry area and the lithium dendrite caused by the poor liquid of the batteries is easy to lead the phenomenon of electrostatic breakdown in the batteries and direct short circuit between the anodes and the cathodes, resulting in potential safety hazards, such as combustion and explosion of the lithium-ion batteries. The potential safety hazards of the lithium-ion batteries restrict development space used in high-power and large-capacity electric power sources.

Polyvinylidene fluoride (PVDF) and derivatives thereof possess membrane-forming ability only in the presence of plasticizers. The PVDF membrane containing plasticizers has poor processability because of serious disadvantage of self-adhered property and relatively low mechanical strength. It can not be separately prepared to be a microporous polymer membrane. The preparation method of such a microporous polymer membrane basically adopts the following procedure. The PVDF membrane containing plasticizer and battery electrode of anode and cathode are prepared to be a dry battery cell by thermal bonding. Then, organic solvent is used to extract the dry battery cell to form a PVDF microporous polymer membrane bonded with the anode and cathode. To solve the technical difficulties for preparation of PVDF microporous polymer membrane to allow that it can be separately prepared to be a membrane like a microporous polyolefin membrane and enhance the operability in preparation of the battery, PVDF solution is coated on the microporous polyolefin membrane, and then the solvent extraction method or phase inversion method is used to prepare the microporous polyolefin/polyvinylidene fluoride composite membrane.

The main disadvantage of the microporous polyolefin membrane, the microporous polyvinylidene fluoride membrane and the microporous polyolefin/polyvinylidene fluoride composite membrane is their relatively low heat resistance. Once the internal temperature of the batteries exceeds 150° C., though the polyolefin-based materials will melt, micropores will disappear and thereby block ion conduction, so-called fuse protective effect. As the microporous polymer membrane will shrink greatly while melting and decrease in size, direct short circuit may occur between anodes and cathodes of the batteries; causing safety problems, such as combustion and explosion of the batteries.

To overcome heat resistance problem of microporous polyolefin membrane, reduce shrinkage thereof at high temperature and improve safety of batteries, CN101250276 discloses a method for modifying microporous polyolefin membrane. The method is dipping the membrane of a liquid lithium-ion battery into the solution comprising organic solvents (like acetone) and chemical crosslinking agent monomer (difunctional acrylic ester monomer) and polymers with crosslinking function (polyvinylidene fluoride, polytetrafluoroethylene, etc.). Poly-reaction of monomers directly affects performance of the modified membrane in modification and conditions are hard to control. It requires adding 0.0001%-0.1% of a thermal initiator to the battery core, and requires adding a certain amount of the chemical crosslinking monomer between anode and cathode pieces. This makes the manufacturing process of batteries complicated.

In general, new modified polyolefin membranes are urgently needed at present for reducing shrinkage thereof at high temperature, and a low-cost membrane used for non-aqueous electrolyte energy storage devices by a simple production method.

The inventors of the invention described and claimed herein have synthesized a microporous polymer membrane prepared from aqueous polymeric colloid emulsion by coating the aqueous polymeric colloid emulsion on a non-woven fabric to prepare a membrane with higher heat resistance and mechanical strength than the membrane described in CN101226994. The preparation process is a clean and environment-friendly production technique using water as a solvent. A non-woven fabric is polar and is easily modified by the polar aqueous polymers. However, the microporous polyolefin membrane is non-polar and is not easily modified by the polar aqueous polymers. So, the inventors have made bold attempts.

SUMMARY OF THE INVENTION

A first technical problem to be solved by the invention is to provide a microporous polyolefin membrane modified by aqueous polymer with little thermal shrinkage.

The technical proposal of the invention is as follows: It consists of a microporous polyolefin membrane and an aqueous polymer coating on its surface. The aqueous polymer coating is obtained by the following steps: Polymer colloidal emulsion is prepared by copolymerizing 100 parts (by weight) of water-soluble polymer, 30-500 parts of hydrophobic monomer, 0-200 parts of hydrophilic monomer and 1-5 parts of initiator. 0-100% inorganic filler, 0-50% of an organic filler and 20-100% plasticizer (on the basis of 100% solid content of the polymer colloidal emulsion) are added to the emulsion to create a slurry. The slurry is coated on the surface of the microporous polyolefin membrane and then dried to obtain the modified membrane.

The water-soluble polymer of the invention is selected from the group consisting of (a) polyvinyl alcohol, (b) polyethylene oxide, and (c) polyvinyl pyrrolidone or water-soluble copolymer of polyvinyl pyrrolidone. The polymerization degree of the polyvinyl alcohol is 1700-2400, and the hydrolysis degree is 50-99. The polyethylene oxide has a molecular weight in the range between 100,000-2,000,000; the polyvinyl pyrrolidone or water-soluble copolymer of polyvinyl pyrrolidone has a molecular weight in the range between 500-100,000, preferably 10,000-30,000.

The structural formula of the hydrophobic monomer is $CH_2=CR^1R^2$, wherein:
$R^1$=—H or —$CH_3$;
$R^2$=—$C_6H_5$, —$OCOCH_3$, —$COOCH_3$, —$COOCH_2CH_3$, —$COOCH_2CH_2CH_3$, —$COOCH_2CH(CH_2CH_3)$ $CH_2CH_2CH_3$ or —CN.
The hydrophobic monomer is selected at least one from the above mentioned hydrophobic monomers.

The structural formula of the hydrophilic monomer is $CHR^3=CR^4R^5$, wherein:
$R^3$=—H, —$CH_3$ or —COOLi;
$R^4$=—H, —$CH_3$ or —COOLi;
$R^5$=—COOLi, —$CH_2$COOLi, —$COO(CH_2)_6SO_3Li$, —$CONH_2$, —$CONHCH_3$,

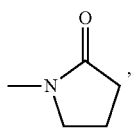

—$CONHCH_2CH_3$, —$CON(CH_3)_2$ or —$CON(CH_2CH_3)_2$.
The hydrophilic monomer is selected at least one from the above-mentioned hydrophilic monomers.

The described microporous polyolefin membrane is microporous polypropylene membrane (PP membrane), microporous polyethylene membrane (PE membrane) or 3-layer composite membrane PP/PE/PP. The porosity of the polyolefin membrane is 20%-90%, preferably 35%-85%.

The second technical problem to be solved by the invention is to provide an environment friendly preparation technique for obtaining a modified membrane with low cost and excellent performance for non-aqueous electrolyte energy storage devices.

The preparation method of the microporous polyolefin membrane modified by aqueous polymer described above comprises the following steps:

(a) Preparation of Polymer Colloid Emulsion

Adding water-soluble polymer and hydrophilic monomer to water, stirring until the solids completely dissolve. Adding hydrophobic monomer and initiator to the reactor for polyreaction to obtain the polymeric colloid emulsion.

(b) Preparation of Polymeric Colloid Slurry

Adding 0-100% of an inorganic filler, 0-50% of an organic filler and 20-100% of a plasticizer to the polymer colloid emulsion (based on 100% solid content thereof), stirring, grinding and filtering to obtain the aqueous polymer slurry. And (c) Preparation of the Microporous Polyolefin Membrane Modified by Aqueous Polymer by Coating Coating the aqueous polymer slurry (obtained in step (b)) on one or two surfaces of the microporous polyolefin membrane, drying to obtain the microporous polyolefin membrane modified by aqueous polymer.

In order to improve surface energy and roughness of the microporous polyolefin membrane so as to bond the microporous polyolefin membrane and the aqueous polymer slurry, the described microporous polyolefin membrane is surface modified by the following methods.

In the invention, the inventors modify surface of the microporous polyolefin membrane by the following methods: (1) pretreating the microporous polyolefin membrane by at least one of heat treatment (corona), plasma treatment, high-energy irradiation treatment or light treatment; (2) precoating the surface of the microporous polyolefin membrane by at least one of coupling agents or bonders; (3) modifying surface of the microporous membrane by both (1) and (2). The treatment methods change surface characteristic of the microporous membrane only, can keep inherent characteristic of the membrane and do not affect the microporous structure, etc.

The third technical problem to be solved by the invention is to provide the use of the microporous polyolefin membrane modified by aqueous polymer to preparing lithium-ion batteries, supercapacitors and battery/supercapacitor energy storage devices.

Advantages of the Invention are as Follows

The polyolefin membrane modified by the aqueous polymer has thermal shutdown effect (the polyolefin membrane is molten at high temperature, resulting in closing of micropores) and little thermal shrinkage, so can solve the major problem of shrinkage of the polyolefin membrane at high temperature to improve the battery safety. Moreover, the rupture temperature of the membrane is increased, which ensures integrity of the membrane at high temperature, thus further improving the battery safety. In addition, due to its high polarity, the coating material can improve liquid absorbency and retention of the membrane, thus better improving charge and discharge performance, rate performance, cycle life and safety performance of the batteries.

In this invention, chemical reaction is absent in preparation of the membrane, thus being easy to control. In addition, the slurry and the polyolefin membrane have excellent cohesiveness to ensure interfacial bonding stability and uniformity. In addition, the slurry and the electrodes have good compatibility so as to ensure good performance of the battery. Other techniques for preparing the batteries are completely consistent with the existing techniques. Meanwhile, flame retardance of the coating material ensures safety protection of the batteries by the membrane from the following three aspects: (1) the thermal shutdown performance of the membrane; (2) no short circuit (direct contact) between the anode and the cathode due to little shrinkage of the modified membrane in the invention; and (3) avoiding further combustion of the batteries in the event of any safety accident due to self flame retardance of the membrane.

DETAILED DESCRIPTION OF THE PREFERRED EMBODIMENTS

The polyolefin membrane modified by aqueous polymer of the invention is obtained by the following steps: Polymer colloidal emulsion is prepared by copolymerizing 100 parts (by weight) of water-soluble polymer, 30-500 parts of hydrophobic monomer, 0-200 parts of hydrophilic monomer and 1-5 parts of initiator. Then 0-100% inorganic filler and 20-100% plasticizer (on the basis of 100% solid content of the polymer colloidal emulsion) are added to the emulsion to give slurry. The slurry is coated on the surface of the microporous polyolefin membrane and then drying to obtain the modified membrane.

The described microporous polyolefin membrane is microporous polypropylene membrane (PP membrane), microporous polyethylene membrane (PE membrane) or 3-layers composite membrane PP/PE/PP. The porosity of the polyolefin membrane is 20%-90%, preferably 35%-85%.

As polyolefin materials are non-polar high polymers and free from polar groups, surface energy thereof is relatively low. Because the polyolefin materials are chemically inert and functionalized properties such as wetability, bondability, dyeability and biocompatibility are relatively poor, resulting in poor compatibility of membrane materials with a majority of polymers and lower bonding strength with polymeric colloid in practical application. Therefore, for smooth implementation of the invention, the polyolefin membrane needs surface modification to introduce polar groups or coating precoating layers on surfaces of the microporous polyolefin membrane so as to improve surface energy of the membrane material and improve roughness of membrane surfaces to thereby increase surface bondability and eliminate weak boundary layers of the surfaces, thus achieving bonding of the membrane with the aqueous polymer slurry.

At present, surface modification methods of the polyolefin membrane mainly include chemical modification, physical modification, blending modification, surfactant method, plasma treatment, photografting modification, high-energy radiation grafting modification, etc. Chemical oxidation, physical sandblasting, polishing, etc. having disadvantages of difficult thickness control, complex post-treatment techniques of the membrane material, etc., thus scale production is difficult. The modified membrane has poor uniformity due to difficult control of grafting reaction when graft modifying polymer monomers on the polyolefin membrane by present technologies, such as plasma, lighting and high-energy radiation. The grafting reaction occurs in micropores of the membrane resulting in the reduction of pore volume and porosity, and the change of pore shape and tortuosity after grafting. This adversely affects properties of the membrane and further affects battery performance.

In this invention, the inventors pretreat the microporous polyolefin membrane by the following methods: (1) heat treatment (corona), plasma treatment and high-energy irradiation treatment or light treatment; (2) precoating surface of the microporous polyolefin membrane by at least one of coupling agents or bonders; (3) modifying surface of the microporous membrane by combination of the two methods. The treatment methods change the surface characteristic of the microporous membrane only; keeping inherent characteristics of the membrane and do not affect the microporous structure, etc.

Preferably, the microporous membrane is pretreated by at least one of heat treatment (corona), plasma treatment, lighting, high-energy radiation and the like, and then coated by at least one of coupling agent or bonder such as acrylonitrile modified EVA (ethylene-vinyl acetate copolymer) and functionalized silanes (vinylsilane, octylsilane, aminosilane, epoxy silane, 3-methacryloxypropyltrimethoxysilane, isocyanate silane, etc.).

The water-soluble polymer of the invention is from the group consisting of (a) polyvinyl alcohol, (b) polyethylene oxide and (c) polyvinyl pyrrolidone or water-soluble copolymer of polyvinyl pyrrolidone. The polymerization degree of the polyvinyl alcohol is 1700-2400, and the hydrolysis degree is 50-99. The polyethylene oxide has a molecular weight in the range between 100,000-2,000,000; the polyvinyl pyrrolidone or water-soluble copolymer of polyvinyl pyrrolidone has a molecular weight in the range between 500-100,000, preferably 10,000-30,000.

The structural formula of the hydrophobic monomer is $CH_2=CR^1R^2$, wherein:
$R^1=$—H or —$CH_3$;
$R^2=$—$C_6H_5$, —$OCOCH_3$, —$COOCH_3$, —$COOCH_2CH_3$, —$COOCH_2CH_2CH_2CH_3$, —$COOCH_2CH(CH_2CH_3)CH_2CH_2CH_2CH_3$ or —CN.
The hydrophobic monomer is selected at least one from the above-mentioned hydrophobic monomers;

The structural formula of the hydrophilic monomer is $CHR^3=CR^4R^5$, wherein:
$R^3=$—H, —$CH_3$ or —COOLi;
$R^4=$—H, —$CH_3$ or —COOLi;
$R^5=$—COOLi, —$CH_2COOLi$, —$COO(CH_2)_6SO_3Li$, —$CONH_2$, —$CONHCH_3$,

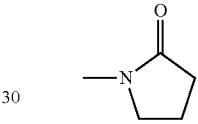

—$CONHCH_2CH_3$, —$CON(CH_3)_2$ or —$CON(CH_2CH_3)_2$.
The hydrophilic monomer is selected at least one from the above-mentioned hydrophilic monomers.

The preparation method of the microporous polyolefin membrane modified by aqueous polymer of the invention is environment-friendly with low production cost and excellent performance of the modified microporous polyolefin membrane. The preparation method comprises the following steps:

a) Preparation of Polymeric Colloid Emulsion

Adding water-soluble polymer and hydrophilic monomer and the auxiliaries to water, stirring and heating until the solids completely dissolve. Keeping reactor temperature at the required reaction temperature of 30-90° C., adding the hydrophobic monomer to the reactor (once, batches or dropwise), and adding an initiator to initiate 4-35 h polymerization reaction to obtain the polymeric colloid emulsion, wherein the initiator can also be added dropwise or batches during reaction.

The initiator is ammonium persulfate, potassium persulfate, hydrogen peroxide or azobisisobutylamidine or a redox initiation system composed of the above-mentioned initiator with $Na_2SO_3$ and $FeSO_4$.

Not less than 3 parts by weight of auxiliary also can be added as an emulsifier to stabilize the colloid emulsion to some degree. The auxiliary can be selected from dodecyl sulfonate, dodecyl benzene sulfonate and vinyl sulfonate.

b) Preparation of Polymeric Colloid Slurry

Adding 0-100% of an inorganic filler, 0-50% of an organic filler and 20-100% of plasticizer to the polymeric colloid emulsion (based on 100% solid content thereof), stirring and dispersing uniformly, and grinding for 2-10 h, preferably 3-5 h, and then, filtering the slurry by a sieve with less than 200 meshes to remove materials of larger particles which are not ground.

The plasticizer is at least one of propylene glycol, benzyl alcohol, n-butyl alcohol, isopropyl alcohol, diethyl phosphate, triethyl phosphate, trimethyl phosphate, tributyl phosphate, isoamyl acetate, ethyl lactate, methyl lactate, ethyl butyrate, diethyl carbonate, tributyl propionate, amylmethylacetate, isopropyl acetate, diisobutyl ketone, methyl ethyl ketone, dipropyl ketone, ethyl butyl ketone or methylamylketone.

To improve heat resistance, porosity and membrane rigidity of the microporous polymers membrane, an inorganic filler can be added to the aqueous polymeric colloid emulsion. Usually, the inorganic filler is micropowder with larger specific surface area and stronger surface adsorption capacity that will benefit adsorption of electrolyte and dissociation of electrolyte salt, thus improving ionic conductivity of the membrane. The inorganic filler is fume colloidal silica, alumina, titanium dioxide, zirconium dioxide, magnesia, calcium carbonate or fiber glass.

To improve dispersibility of the inorganic filler in the polymeric colloid emulsion, a silane coupling agent can be added. The coupling agent can be selected from 3-aminopropyltriethoxysilane, 2-amino ethyl-3-aminopropyltrimethoxysilane, 3-glycidyltrimethoxysilane, vinyltriethoxysilane, vinyltrimethoxysilicane or vinyltri(2-methoxyethoxy)silane. The addition amount of the silane coupling agent is 0.5-5.0% of the inorganic filler by weight.

To enhance the safety of the modified microporous polyolefin membrane, a micron-sized organic filler also can be added to modify the membrane because organic filler is good for blocking the ionic conduction of the membrane. So, once working temperature of the batteries is out of control, within 100-130° C., the modified microporous polyolefin membrane is to prevent the continuous flow of ions to ensure the safety of batteries. The micron-sized organic filler can be selected at least one from ultrafine polyethylene wax, oxide wax powder and ultrafine polyethylene wax powder. Amount of the organic filler added is 5.0-20% based on 100% solid content of the polymeric colloid emulsion.

c) Surface Modification of the Polyolefin Membrane

As polyolefin materials are non-polar high polymers, microporous membranes made of such polymers have lower surface energy, poor compatibility with a majority of polymers and lower bonding strength with polymeric colloid to overcome the disadvantage and improve surface energy of the microporous membrane, the polyolefin membrane is surface modified by the following methods:

1) treating the microporous polyolefin membrane by at least one of heat treatment, plasma treatment, high-energy irradiation treatment or light treatment;

2) coating surface of the microporous polyolefin membrane by at least one of EVA modified by acrylonitrile or functionalized silanes (vinylsilane, octylsilane, aminosilane, epoxy silane, 3-methacryloxypropyltrimethoxysilane, isocyanate silane, etc.); or 3) pretreating the microporous polyolefin membrane by at least one of heat treatment, plasma treatment, high-energy irradiation treatment or light treatment, and then coating the surface of the microporous polyolefin membrane by at least one of the EVA modified by acrylonitrile or the functionalized silanes.

d) Preparation of the Microporous Polyolefin Membrane Modified by an Aqueous Polymer by Coating Coating the aqueous polymer slurry (obtained in step b) on one or two surfaces of the microporous polyolefin membrane which is surface modified in step c. The coating thickness (wet) is 2-600 μm, preferably 5-400 μm.

The coating can be applied by a variety of methods, such as printing, micro-intaglio printing, dip coating, reverse roller coating, direct roller coating, roller scrape coating, comma knife coating, precision direct micro-roller coating, precision reverse micro-roller coating, slide coating, extrusion coating, slot coating, curtain coating, etc.

The microporous membrane is coated once by any one of the above-referenced methods or by a combination of a plurality of the above-referenced methods, or by one-machine multi-point coating method, for example, coating 1-drying 1; coating 2-drying 2, etc., that is, one support is continuously coated with different materials, or different positions of one support are coated. So it can be coated continuously by a plurality of methods by one coater.

e) Drying

The wet membrane coated in step d is dried by heated air, hot air, infrared radiation and heating methods of other technologies. Drying temperature is 30-160° C., preferably 40-100° C. The final membrane is obtained with thickness of 10-100 μm, preferably 12-50 μm.

The microporous polyolefin membrane modified by the aqueous polymer coating above-mentioned can be used for preparing lithium-ion batteries, supercapacitors and battery/supercapacitor energy storage devices.

The invention will be further described in conjunction with the following preferred examples.

EXAMPLE 1

Preparation of the Microporous Polyolefin Membrane Modified by an Aqueous Polymer of the Invention a) Preparation of Polymeric Colloid Emulsion Lipophilic monomers styrene (St)/butyl acrylate (BA)/acrylonitrile (AN) were added to aqueous periston solution for ternary copolymerization in an aqueous phase. The copolymer composition was PVP:St:BA:AN=10:2:4:2 (by weight; the same below) and the copolymer content is 15%.

The polymer emulsion was prepared by the following steps: 1000 g distilled water was added to a four-mouth reaction vessel with condensate water. Then 100 g periston was added to the reaction vessel, and the reaction vessel was heated to 90□ under stirring. When the material was transparent, 20 g styrene (St) monomer and 2 g ammonium persulfate initiator were added. After reacting for 20 h, the mixture changed into a white emulsion. Then, 40 g butyl acrylate (BA) was added. After reacting for 2 h, 20 g acrylonitrile monomer and 1.5 g initiator were added to the reaction vessel. The polymeric colloid emulsion was obtained after 12 h polymerization.

b) Preparation of Polymeric Colloid Slurry 19 g zirconium dioxide filler, 5 g polyethylene wax powder and 160 g benzyl alcohol plasticizer were added to the polymeric colloid emulsion obtained above. After 6 h high-speed stirring and 5 h ball milling, the polymeric colloid slurry was obtained. Viscosity of the slurry was determined at ambient temperature of 20.6° C. and RH=64%: Tslurry=35° C. and viscosity=2500 mpa·s.

c) Surface Modification of the Polyolefin Membrane

The surface modification of the polyolefin membrane is mainly to improve wetability and bondability of the polyolefin with the aqueous polymer slurry. A simple method easy for scale production is a combination of a pretreatment and pre-coating method. That is, the microporous membrane is pretreated by such treatment methods as corona, plasma, lighting and high-energy radiation, and then coated by coupling agents or bonders. Thus, a coating is introduced between the microporous membrane and the aqueous slurry which has excellent bonding strength with the microporous polyolefin membrane and the aqueous polymer slurry.

As an example, the microporous polypropylene (PP) membrane with a thickness of 16 μm and basis weight of 10.8 g/m² was corona treated (corona power of 400 w) at a speed of 20 m/min. Then, 20 parts of the EVA rubber modified by acrylonitrile (solid content was 20%) and 200 parts of ethyl acetate were prepared into the slurry with a solid content of 1.8%. The slurry was coated on the pretreated polypropylene microporous membrane by printing. The coating thickness (one side on the pretreated membrane) was controlled to be less than 2 μm based on gravure rollers, speed, rubber roller pressure and the like parameters.

d) Preparation of the Microporous Polyolefin Membrane Modified by an Aqueous Polymer by Coating The prepared aqueous slurry was coated on the precoated microporous PP membrane by a continuous roller coating process (belt speed is 5 m/min). In the roller coating process, slurry thickness was controlled by a scraper. Coating was performed and the coating layer can be controlled by contacting the belts with the feeding rollers running in the opposite direction. Subsequently, coated wet membrane was sent to an oven with circulating hot air for drying to obtain a modified polypropylene membrane with a thickness of 25 μm.

Air permeability of the membrane prepared above approximated 40 (sec/in²·100 ml·1.22 kPa), which referred to time for passing 100 ml air per square inch at pressure of 1.22 kPa (the same for the examples below). Shrinkability and air permeability of the membrane at different temperatures are listed in Table 1 and Table 2.

TABLE 1

Shrinkability of the membrane at different temperatures

| Type of membrane | Shrinking percentage at different temperatures (%) | | | | | | | |
|---|---|---|---|---|---|---|---|---|
| | 100° C. | 110° C. | 120° C. | 130° C. | 140° C. | 150° C. | 160° C. | 170° C. |
| PP | 3 | 5 | 9 | 12 | 17 | Deformation | Melting | |
| Example 1 | 1.3 | 2 | 3 | 4 | 7 | 15 | 20 | Melting |

Note:
Test conditions for shrinkability in examples below were the same as those of the example 1. The membrane was vacuumed at each temperature for 2 h. The membrane, i.e., PP, PE or composite membrane in the examples had the same thickness of 25 ± 1 μm Table 1 refers to shrinkability data of the modified polypropylene membrane in example 1 at different temperatures. Compared with the polypropylene (PP) membrane, the modified polypropylene membrane kept better shape at 160° C. The temperature resistance is very beneficial to battery safety. In addition, the shrinkability of the membrane in the example of the invention was tested in a free state, the shrinkability in the batteries being smaller, which is consistent with the thermal box test of batteries hereinafter.

TABLE 2

Air permeability of the membrane at different temperatures

| Membrane | Air permeability of membrane at different | | | |
|---|---|---|---|---|
| | 110° C. | 120° C. | 130° C. | 135° C. |
| Example 2 | 43 | 50 | 280 | 780 |

Note:
Test conditions for air permeability at high temperature in examples below were the same as those of the example1. The membrane was treated at each temperature for 10 min.

EXAMPLE 2

Preparation of the Microporous Polyolefin Membrane Modified by an Aqueous Polymer of the Invention a) Preparation of Polymeric Colloid Emulsion In this example, hydrophilic high molecular polyvinyl alcohol (PVA) 1750 and lipophilic monomers vinyl acetate (VAc)/ethyl acrylate (EA)/acrylonitrile (AN) were graft copolymerized in an aqueous phase to prepare an aqueous polymeric colloid emulsion used for a lithium battery membrane; the copolymer composition was PVA:VAc:EA:AN=10:2:2:5 (by weight, the same below), copolymer content was 17% and a product obtained was a white opaque emulsion.

A specific preparation method of the polymeric colloid emulsion comprised the following steps: 1000 g distilled water and 100 g polyvinyl alcohol (PVA) 1750 were added to a four-mouth reaction vessel with condensate water, and the reaction vessel was heated to 75° C. while stirring at a speed of 100 rpm; and 3 h later dissolution was considered completed when a material obtained was transparent, heating was stopped and the material was naturally cooled to 55° C., then 40 g mixture of lipophilic monomers vinyl acetate (VAc) and ethyl acrylate (EA) at ratio of 1:1 was added once, stirred for 10 min dispersion, and 0.5 g aqueous initiator peroxysulfuric acid (aps) was added, and a material obtained as light blue about 20 min later and changed into white milky 30 min later to obtain a reaction intermediate by 2 h copolymerization.

The reaction solution and 50 g lipophilic monomer acrylonitrile (AN) were mixed and dispersed, and further 1.5 g initiator and 0.5 g weak acid lithium vinylsulfonate (SVSLi) were added for 10 h emulsion polymerization to obtain the polymeric colloid emulsion.

b) Preparation of Polymeric Colloid Slurry 19 g silicon dioxide filler and 160 g amylmethylacetate plasticizer were added to the polymeric colloid emulsion, stirred at high speed for 6 h and then ball-milled for 5 h. Viscosity of the slurry was determined at ambient temperature of 20.6° C. and RH=64%: Tslurry=35° C. and viscosity=2800 mpa·s.

c) Surface Modification of the Polyolefin Membrane

The surface modification steps were basically the same as those of example 1, except that the polyolefin membrane in this example was a polyethylene microporous membrane with a thickness of 16 μm and a basis weight of 9.8 g/m². The bonder used was octane triethoxysilane.

d) Preparation of the Microporous Polyolefin Membrane Modified by Aqueous Polymer by Coating The slurry was coated on the polyethylene microporous membrane pretreated in step c) by a roller extrusion method (belt speed was about 2 m/min), and thereupon moisture and the plasticizer were volatized by hot air of the required temperature and a drying tunnel irradiated by infrared. Finally, a modified polyethylene microporous membrane with a thickness about 25 μm was obtained. Air permeability of the membrane prepared was about 30 (sec/in²·100 ml·1.22 kPa). Shrinkability and air permeability of the membrane at different temperatures are listed in Table 3 and Table 4.

TABLE 3

Shrinkability of the membrane at different temperatures

| | Shrinking percentage at different temperatures (%) | | | | | | | |
|---|---|---|---|---|---|---|---|---|
| Type of membrane | 100° C. | 110° C. | 120° C. | 130° C. | 140° C. | 150° C. | 160° C. | 170° C. |
| PE | 6 | 8 | 13 | Melting | | | | |
| Example 2 | 4 | 5 | 7 | 14 | 20 | 24 | Deformation | |

TABLE 4

Air permeability of the membrane at different temperatures

| | Air permeability of the membrane at different temperatures (Sec/100 ml) | | | |
|---|---|---|---|---|
| Membrane | 110° C. | 120° C. | 130° C. | 135° C. |
| Example 2 | 31 | 38 | 230 | 500 |

Table 4 refers to air permeability data of the modified polyethylene membrane in example 2 at different temperatures. As shown in Table 4, when temperature rose to 130° C., air increasingly permeating the membrane quickly increased, that is, the air permeability obviously reduced. The main reason was that melting point of the membrane materials was achieved when temperature rose to 130° C., resulting in melting; and micropores were blocked due to tension and porosity suddenly reduced and even disappeared, thus air permeability quickly reduced. Such performance is very beneficial to battery safety, the membrane is blocked in case of abnormal circumstances of the batteries when temperature rises to above 130° C., thus blocking further reaction and avoiding explosion and combustion of the batteries.

EXAMPLE 3

Preparation of the Microporous Polyolefin Membrane Modified by Aqueous Polymer of the Invention a) Preparation of Polymeric Colloid Emulsion In this example, polyvinyl alcohol 1799 (PVA) and hydrophobic monomers ethenyltriethyloxysilane coupling agent (151)/acrylonitrile (AN) were graft polymerized in an aqueous phase to prepare aqueous polymer emulsion, and the copolymer composition was PVA:(151):AN=10:4:5 (by weight).

A specific preparation method of the polymeric colloid emulsion comprised the following steps: 1000 g distilled water and 100 g hydrophilic monomer polyvinyl alcohol (PVA) 1799 were added to a four-mouth reaction vessel with condensate water, and the reaction vessel was heated to 90° C. until a material obtained was transparent, 40 g ethenyltriethyloxysilane 151, 50 g acrylonitrile (AN) and 1.9 g peroxysulfuric acid initiator were added thereto for 12 h graft copolymerization to obtain the polymeric colloid emulsion.

b) Preparation of Polymeric Colloid Slurry

An alumina filler dispersed by triethyl phosphate was added to the polymer emulsion, and the specific amount used comprised 20% of alumina filler and 100% of triethyl phosphate plasticizer. An obtained mixture was stirred at high speed for 4 h and ball-milled for 5 h, and viscosity of the slurry was adjusted to 2500 mpa·s.

c) Surface Modification of the Polyolefin Membrane

Steps were the same as those of example 1, except that the microporous polyolefin membrane used in the example was 3-layer composite membrane PP/PE/PP and had thickness of 16 μm and a basis weight of 10.7 g/m². The micropores underwent Co60 high-energy irradiation by 5 Mrad high energy at dose rate of 2,350,000 rad/h.

d) Preparation of the Microporous Polyolefin Membrane Modified by Aqueous Polymer by Coating The slurry was coated on the polyethylene microporous membrane pretreated in step c) by slide coating (belt speed was about 12 m/min), and thereupon moisture and the plasticizer were volatized by hot air with the required temperature and a drying tunnel irradiated by infrared. Finally, a modified microporous membrane with thickness about 25 μm was obtained. Air permeability of the membrane prepared was about 34 (sec/in²·100 ml·1.22 kPa). Shrinkability and air permeability of the membrane at different temperatures are listed in Table 5 and Table 6.

TABLE 5

Shrinkability of the membrane at different temperatures

| | Shrinking percentage at different temperatures (%) | | | | | | | |
|---|---|---|---|---|---|---|---|---|
| Type of membrane | 100° C. | 110° C. | 120° C. | 130° C. | 140° C. | 150° C. | 160° C. | 170° C. |
| PP/PE/PP | 4 | 6.2 | 11 | 18 | 25 | Deformation | | |
| Example 3 | 2 | 2.5 | 3.3 | 5 | 7 | 18 | Deformation | |

TABLE 6

Air permeability of the membrane at different temperatures

| | Air permeability of the membrane at different temperatures (Sec/100 ml) | | | |
|---|---|---|---|---|
| Membrane | 110° C. | 120° C. | 130° C. | 135° C. |
| Example 2 | 31 | 38 | 230 | 500 |

EXAMPLE 4

Preparation of the Microporous Polyolefin Membrane Modified by an Aqueous Polymer of the Invention a) Preparation of Polymeric Colloid Emulsion Steps for synthesizing slurry: 125.0 g acrylamide (AM) was dissolved into 1800.0 ml water by stirring, 75.0 ml vinyl acetate (VAc) and 15.0 ml isopropyl alcohol (IPA) were added, $N_2$ was added at 60° C. for 40 min deoxygenation and then 2.0 g initiator ammonium persulfate (AP) was added to gradually increase viscosity of the system, 125.0 ml acrylonitrile (AN) was added dropwise when an obtained mixture changed milky white after about 40 min reaction, and the mixture was copolymerized to obtain the polymeric colloid emulsion.

b) Preparation of Polymeric Colloid Slurry

10% of alumina, 20% of silicon dioxide filler, 120% of methylamylketone plasticizer and 35% of polyethylene wax powder were added to the polymeric colloid emulsion prepared in step a, stirred at high speed for 8 h and ball-milled for 2 h, and viscosity of the slurry was adjusted to 2500 mpa·s.

c) Surface Modification of the Polyolefin Membrane

An octanesilane coupling agent was precoated on a PE microporous membrane with a thickness of 20 μm and basic weight of 11.2 g/m² for modification.

d) Preparation of the Microporous Polyolefin Membrane Modified by an Aqueous Polymer by Coating A modified PE microporous membrane with a thickness of 25 μm was obtained as described in example 1. Air permeability is 42 (sec/in²·100 ml·1.22 kPa). Shrinkability and air permeability of the membrane at different temperatures are listed in Table 7 and Table 8.

TABLE 7

Shrinkability of the membrane at different temperatures

| Type of membrane | Shrinking percentage at different temperatures (%) | | | | | | | |
| --- | --- | --- | --- | --- | --- | --- | --- | --- |
| | 100° C. | 110° C. | 120° C. | 130° C. | 140° C. | 150° C. | 160° C. | 170° C. |
| PE | 4 | 5.7 | 10 | Melting | | | | |
| Example 4 | 2 | 3.8 | 7 | 12 | 17 | 23 | Deformation | |

TABLE 8

Air permeability of the membrane at different temperatures

| Membrane | Air permeability of the membrane at different temperatures (Sec/100 ml) | | | |
| --- | --- | --- | --- | --- |
| | 110° C. | 120° C. | 130° C. | 135° C. |
| Example 4 | 44 | 56 | 341 | 876 |

EXAMPLE 5

Preparation of the Microporous Polyolefin Membrane Modified by Aqueous Polymer of the Invention a) Preparation of Polymeric Colloid Emulsion Steps were basically the same as those of example 2, except that the mixture of lipophilic monomers vinyl acetate (VAc) and ethyl acrylate (EA) were replaced with 2.5 parts of hydrophilic methacrylic acid (MAA) and 5 parts of lipophilic monomer acrylonitrile (AN), and weak acid lithium vinylsulfonate (SVSLi) was replaced with strong acid lithium dodecyl sulfonate (DsLi) for emulsion polymerization.

Copolymer composition of the polymeric colloid emulsion was PVA:MAA:AN=10:2.5:5, copolymer content was 11% and a product was a white and translucent colloid.

b) Preparation of Polymeric Colloid Slurry

15% of silicon dioxide filler treated by 2% of a coupling agent, and 15% of ethyl butyrate plasticizer were added to the polymeric colloid emulsion prepared based on 100% solid content thereof, and viscosity of the slurry was adjusted to 2500 mpa·s.

c) Surface Modification of the Polyolefin Membrane

Steps were the same as those of example 1, except that a 3-layer composite membrane PP/PE/PP with a thickness of 18 μm and a basis weight of 10 g/m² was pretreated by plasma in the example, and then isocyanate triethoxysilane was precoated on the pretreated composite membrane by the method in example 1.

d) Preparation of the Microporous Polyolefin Membrane Modified by an Aqueous Polymer by Coating Steps were the same as those of example 1, i.e., the slurry obtained in step b in the example was coated on the microporous membrane in step c to obtain the final membrane. Air permeability was determined to be 3642 (sec/in²·100 ml·1.22 kPa). Shrinkability and air permeability of the membrane at different temperatures are listed in Table 9 and Table 10.

TABLE 9

Shrinkability of the membrane at different temperatures

| Type of membrane | Shrinking percentage at different temperatures (%) | | | | | | | |
| --- | --- | --- | --- | --- | --- | --- | --- | --- |
| | 100° C. | 110° C. | 120° C. | 130° C. | 140° C. | 150° C. | 160° C. | 170° C. |
| PP/PE/PP | 4 | 6.2 | 11 | 18 | 25 | Deformation | | |
| Example 5 | 2 | 2.5 | 3 | 4.4 | 7 | 18 | Deformation | |

TABLE 10

Air permeability of the membrane at different temperatures

| Membrane | Air permeability of the membrane at different temperatures (Sec/100 ml) | | | |
| --- | --- | --- | --- | --- |
| | 110° C. | 120° C. | 130° C. | 135° C. |
| Example 5 | 38 | 44 | 268 | 673 |

TEST EXAMPLE 1

Electrical Performance Test of the Microporous Polyolefin Membrane Modified by an Aqueous Polymer of the Invention Preparation of Battery Anode 92 parts by weight of lithium cobalt oxide (LiCoO₂) were mixed with 5 parts of acetylene black, 3 parts of LA aqueous binder and 90 parts of deionized water [90 parts by weight of lithium manganese oxide (LiMn₂O₄) were mixed with 7 parts of acetylene black, 3 parts of LA aqueous binder and 90 parts of deionized water, or 85 parts by weight of lithium ferrum oxide (LiFePO₄) were mixed with 7 parts of acetylene black, 8 parts of LA aqueous binder and 90 parts of deionized water] to obtain mixed slurry of an anode, the slurry was filtered by a screen with 100 meshes to remove larger solid particles, then the slurry was evenly coated on both surfaces of 20 μm aluminum foil, and finally the aluminum foil was rolled to obtain an anode piece, and the anode piece was cut based on size and terminal welded.

Preparation of Battery Cathode 95 parts by weight of artificial graphite were mixed with 5 parts of LA132 aqueous binder and 100 parts of deionized water to obtain mixed slurry of a cathode, the slurry was filtered by a screen with 100 meshes to remove larger solid particles, then the slurry was evenly coated on both surfaces of 12 μm copper foil, and finally the aluminum foil was rolled to obtain a cathode piece, and the cathode piece was cut based on size and terminal welded.

Battery Membrane

Battery membrane was the membrane prepared in examples 1-5.

Electrolyte

The electrolyte consisted of ethylene carbonate/diethyl carbonate/methyl ethyl carbonate and LiPF6.

Battery Making

The electrode pieces and an aluminum-plastic composite membrane were packed by a winding way known by those skilled in the art, and the electrolyte was added thereto for sealing after 24 h vacuum drying to make a battery core.

Charge/Discharge and Life Tests 1 c current was charged to 4.2V (for lithium cobaltate) [4.3V for lithium manganate and 3.6V for lithium ferrum oxide] and kept at constant voltage of 4.2V (for lithium cobaltate) [4.3V for lithium manganate and 3.6V for lithium ferrum oxide]; and then discharged at the 1 c current to 2.75V (for lithium cobaltate) [3.0V for lithium manganate and 2.2V for lithium ferrum oxide], thus completing one cycle.

Thermal Box Test

The fully charged battery made in the above step was placed in a hot air drying box and then the battery was forcibly heated at warming speed of 6° C./min, the final temperature of the drying box was set at 150° C., the temperature of 150° C. was kept for 30 min, and change of internal resistance of the battery was detected by an AC ohmmeter (detection was based on Chinese National Standard for lithium-ion secondary batteries GB/T18287-2000).

Overcharge Test

The battery made in the above step was fully charged and then detected for overcharge by a constant current and constant voltage source at 25±3° C. (internal resistance of a conductor clamp was less than 50 mΩ) with overcharge current 3 C (i.e. 3 C) of design capacity of the battery, that is having a discharge rate three times that of the design capacity of the battery, the battery was charged to 10V and kept for 30 min or the test was completed when current was less than 0.05 C, i.e., discharged at a rate 0.05 of the design capacity of the battery (internal resistance of the battery was detected by an AC ohmmeter in the process). Detection was based on Chinese National Standard for lithium-ion secondary batteries GB/T18287-2000).

The modified microporous polyolefin membrane prepared in examples 1-5 were assembled into lithium-ion batteries, anodes were $LiMn_2O_4$, $LiCoO_2$, $LiFePO_4$, $LiCoO_2$ and $LiMn_2O_4$ respectively, and cathodes were graphite cathodes matching the anodes. Testing was performed by the method above. Results of thermal box test and overcharge test are shown in Table 11 and Table 12.

TABLE 11

Thermal box test results of various membrane batteries

| Membrane | Anode material | Internal resistance of the batteries at normal temperature | Internal resistance of the batteries at 150° C. | Thermal box test results |
| --- | --- | --- | --- | --- |
| PE | $LiCoO_2$ | 36 mΩ | — | The battery presented small explosion and combustion when it was heated to 138° C. |
| PP/PE/PP | $LiCoO_2$ | 34 mΩ | — | The battery presented small explosion and combustion after it was heated to 150° C. and kept for 18 min. |
| PP | $LiMn_2O_4$ | 42 mΩ | — | The battery presented small explosion and combustion after it was heated to 150° C. and kept for 2 min. |
| Example 1 | $LiMn_2O_4$ | 35 mΩ | >2 Ω | The battery presented no explosion and combustion after it was heated to 150° C. and kept for 30 min. |
| Example 2 | $LiCoO_2$ | 35 mΩ | >2 Ω | The battery presented no explosion and combustion after it was heated to 150° C. and kept for 30 min. |
| Example 3 | $LiFePO_4$ | 46 mΩ | >2 Ω | The battery present no explosion and combustion after it was heated to 150° C. and kept for 30 min. |
| Example 4 | $LiCoO_2$ | 32 mΩ | >2 Ω | The battery presented no explosion and combustion after it was heated to 150☐ and kept for 30 min. |
| Example 5 | $LiMn_2O_4$ | 36 mΩ | >2 Ω | The battery presented no explosion and combustion after it was heated to 150 and kept for 30 min. |

The results given in table above show safety advantage of the modified microporous polyolefin membrane in overheating environment of the batteries in the thermal box test, and indicates that the modified microporous polyolefin membrane of the invention has high heat resistance and small shrinkage. The results are consistent with thermal shrinkage results of various modified membrane tested in the examples described above. The high heat resistance causes the membrane to withstand high temperature up to 150° C. and reduced shrinkage avoids direct contact between the anode piece and the cathode piece, thus being capable of improving the battery safety.

TABLE 12

Overcharge test results of various membrane batteries

| Membrane | Anode material | Internal resistance of the batteries at normal temperature | Internal resistance of the batteries charged to 10 V | Thermal box test results |
|---|---|---|---|---|
| PE | LiCoO$_2$ | 34 mΩ | — | The battery presented small explosion and combustion when voltage rose to 6.8 V. |
| PP/PE/PP | LiCoO$_2$ | 34 mΩ | — | The battery presented small explosion and combustion after voltage rose to 10 V for 4 min. |
| PP | LiMn$_2$O$_4$ | 46 mΩ | — | The battery presented small explosion and combustion when voltage rose to 10 V. |
| Example 1 | LiMn$_2$O$_4$ | 33 mΩ | >2 Ω | When standard test was completed, the battery presented no explosion and combustion after voltage rose to 10 V for 30 min. |
| Example 2 | LiCoO$_2$ | 37 mΩ | >2 Ω | When standard test was completed, the battery presented no explosion and combustion after voltage rose to 10 V and current reduced to the set lower limit. |
| Example 3 | LiFePO$_4$ | 45 mΩ | >2 Ω | When standard test was completed, the battery presented no explosion and combustion after voltage rose to 10 V and was kept for 30 min. |
| Example 4 | LiCoO$_2$ | 36 mΩ | >2 Ω | When standard test was completed, the battery present no explosion and combustion after voltage rose to 10 V and was kept for 30 min. |
| Example 5 | LiMn$_2$O$_4$ | 36 mΩ | >2 Ω | When standard test was completed, the battery presented no explosion and combustion after voltage rose to 10 V and was kept for 30 min. |

In the overcharge test of the batteries, the electrolyte, the anode and the cathode, etc. presented oxidation reduction reaction inside the batteries when a large amount of heat was emitted. Therefore, the following three main aspects of the membrane were detected by the test: 1. reaction to overheating, i.e. thermal shutdown effect; 2. thermal shrinkage of the membrane in overheating conditions: small shrinkage can avoid direct short circuit between the anodes and the cathodes due to shrinkage of the membrane; and 3. interfacial compatibility and stability among the membrane, the electrolyte and the anodes and the cathodes. Characteristics of the modified microporous polyolefin membrane described above and results of the thermal box test and the overcharge test show that the modified microporous polyolefin membrane has high temperature tolerance, small shrinkage and good compatibility with the electrolyte, the anodes and the cathodes, thus being capable of well improving safety of the batteries.

What is claimed is:

1. A microporous polyolefin membrane modified by an aqueous polymer coating included on at least one surface of said membrane, said aqueous polymer coating being an aqueous polymer slurry formed from a polymeric colloid emulsion by the addition of 0-100% of an inorganic filler, 0-50% of an organic filler and 20-100% of a plasticizer based on 100% solids content of said emulsion, said polymeric colloid emulsion being a copolymerized reaction product of 100 parts (by weight) of water-soluble polymer, 30-500 parts of hydrophobic monomer, 0-200 parts of hydrophilic monomer and 1-5 parts of an initiator.

2. The microporous polyolefin membrane modified by the aqueous polymer coating according to claim 1, characterized in that the water-soluble polymer is from the group consisting of (A) polyvinyl alcohol, (B) polyethylene oxide and (C) polyvinyl pyrrolidone or a water-soluble copolymer of polyvinyl pyrrolidone, wherein the polymerization degree of the polyvinyl alcohol is 1700-2400 and the hydrolysis degree is 50-99; molecular weight of the polyethylene oxide is 100,000-2,000,000; and molecular weight of the polyvinyl pyrrolidone or the water-soluble copolymer of polyvinyl pyrrolidone is 500-100,000; and the structural formula of the hydrophobic monomer is $CH_2\!=\!CR^1R^2$, wherein:

$R^1$=—H or —CH$_3$;

$R^2$=—C$_6$H$_5$, —OCOCH$_3$, —COOCH$_3$, —COOCH$_2$CH$_3$, —COOCH$_2$CH$_2$CH$_3$, —COOCH$_2$CH(CH$_2$CH$_3$)CH$_2$CH$_2$CH$_2$CH$_3$ or —CN;

the hydrophobic monomer being selected from the group consisting of at least one of the above mentioned hydrophobic monomers; and the structural formula of the hydrophilic monomer is $CHR^3=CR^4R^5$, wherein:
$R^3$=—H, —$CH_3$ or —COOLi;
$R^4$=—H, —$CH_3$ or —COOLi;
$R^5$=—COOLi, —$CH_2$COOLi, —COO$(CH_2)_6SO_3$Li, —$CONH_2$, —$CONHCH_3$,

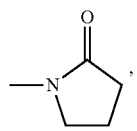,

—$CONHCH_2CH_3$, —$CON(CH_3)_2$ or —$CON(CH_2CH_3)_2$; and the hydrophilic monomer being selected from the group consisting of at least one of the above-mentioned hydrophilic monomers.

3. The microporous polyolefin membrane modified by the aqueous polymer coating according to claim 1, characterized in that the microporous polyolefin membrane is from the group consisting of microporous polypropylene membrane (PP), microporous polyethylene membrane (PE) and 3-layer composite membrane PP/PE/PP.

4. The microporous polyolefin membrane modified by the aqueous polymer coating according to claim 3, characterized in that the microporous polyolefin membrane is surface pretreated by the following methods:
  (1) pretreating the microporous polyolefin membrane by at least one of heat treatment, plasma treatment and high-energy irradiation treatment or light treatment; or
  (2) coating a surface of the microporous polyolefin membrane by at least one of EVA rubber modified by acrylonitrile or by functionalized silanes; or
  (3) pretreating the microporous polyolefin membrane by at least one of heat treatment, plasma treatment and high-energy irradiation treatment or light treatment, and then coating said membrane with at least one of the EVA rubber modified by acrylonitrile or by the functionalized silanes.

5. The microporous polyolefin membrane modified by the aqueous polymer coating according to claim 1, characterized by the aqueous polymer slurry further including EVA rubber modified by acrylonitrile or by functionalized silanes as bonders.

6. The microporous polyolefin membrane modified by the aqueous polymer coating according to claim 5, characterized in that the functionalized silanes are from the group consisting of vinylsilane, octylsilane, aminosilane, epoxy silane, 3-methacryloxypropyltrimethoxysilane and isocyanate silane.

7. A method for preparing the microporous polyolefin membrane modified by the aqueous polymer coating according to claim 1, characterized in that the method comprises the following steps:
  a. preparing the polymeric colloid emulsion by adding a water-soluble polymer and a hydrophilic monomer to water, stirring to completely dissolve; then adding a hydrophobic monomer and an initiator for polyreaction to obtain the polymeric colloid emulsion;
  b. preparing the polymeric colloid slurry from the polymeric colloidal emulsion formed in step a by adding 0-100% of inorganic filler, 0-50% of organic filler and 20-100% of plasticizer to the polymeric colloid emulsion based on 100% solid content thereof, stirring, grinding and filtering to obtain the aqueous polymer slurry; and
  c. coating the aqueous polymer slurry obtained in step b onto one or two sides of the microporous polyolefin membrane and drying.

8. The method for preparing the microporous polyolefin membrane modified by the aqueous polymer according to claim 7, characterized by the additional step of adding to the aqueous polymer slurry EVA rubber modified by acrylonitrile or and functionalized silanes as bonders.

9. The method for preparing the microporous polyolefin membrane modified by the aqueous polymer according to claim 7, characterized in that the microporous polyolefin membrane is surface modified by the following methods:
  (1) pretreating the microporous polyolefin membrane by at least one of heat treatment, plasma treatment and high-energy irradiation treatment or light treatment; or
  (2) coating a surface of the microporous polyolefin membrane by at least one of the EVA rubber modified by acrylonitrile or the functionalized silanes; or
  (3) pretreating the microporous polyolefin membrane by at least one of heat treatment, plasma treatment and high-energy irradiation treatment or light treatment, and then coating said membrane with at least one of the EVA rubber modified by acrylonitrile or by the functionalized silanes.

10. The method for preparing the microporous polyolefin membrane modified by the aqueous polymer according to claim 7, characterized in that the temperature of the polyreaction of is 30-90° C. and the polyreaction time is 4-35 h in step a.

11. The method for preparing the microporous polyolefin membrane modified by the aqueous polymer according to claim 7, characterized by adding the hydrophobic monomer to a reactor once, a plurality of times or dropwise and adding the initiator once, a plurality of times or dropwise during reaction.

12. The method for preparing the microporous polyolefin membrane modified by the aqueous polymer according to claim 7, characterized in that: after coating, the wet coating is 2-600 μm thick; the dried membrane is 10-100 μm thick and drying temperature is 30-160° C.

13. The method for preparing the microporous polyolefin membrane modified by the aqueous polymer according to claim 7, characterized in that the initiator described in step a is from the group consisting of ammonium persulfate, potassium persulfate, hydrogen peroxide and azobisisobutylamidine, or a redox initiation system composed of the above-mentioned initiator with $Na_2SO_3$ and $FeSO_4$.

14. The method for preparing the microporous polyolefin membrane modified by the aqueous polymer according to claim 7, characterized in that the plasticizer is from the group consisting of propylene glycol, benzyl alcohol, n-butyl alcohol, isopropyl alcohol, diethyl phosphate, triethyl phosphate, trimethyl phosphate, tributyl phosphate, isoamyl acetate, ethyl lactate, methyl lactate, ethyl butyrate, diethyl carbonate, tributyl propionate, amylmethylacetate, isopropyl acetate, diisobutyl ketone, methyl ethyl ketone, dipropyl ketone, ethyl butyl ketone and methylamylketone.

15. The method for preparing the microporous polyolefin membrane modified by the aqueous polymer according to claim 7, characterized in that the inorganic filler is from the group consisting of fume colloidal silica, alumina, titanium dioxide, zirconium dioxide, magnesia, calcium carbonate and fiber glass.

16. The method for preparing the microporous polyolefin membrane modified by the aqueous polymer according to claim 8, characterized in that the coupling agent is from the group consisting of 3-aminopropyltriethoxysilane, 2-aminoethyl-3-aminopropyltrimethoxysilane, 3-glycidyltrimethoxysilane, vinyltriethyloxysilane, vinyltrimethoxysilicane and vinyltri(2-methoxyethoxy)silane, and the addition amount of the silane coupling agent is 0.5-5.0% of the inorganic filler by weight.

17. The method for preparing the microporous polyolefin membrane modified by the aqueous polymer according to claim 7, characterized in that the organic filler described in step a is from the group consisting of ultrafine polyethylene wax, oxide wax powder and ultrafine polyethylene wax powder, and the addition amount of the organic filler is 5.0-20% based on 100% solid content of the polymeric colloid emulsion.

18. The method for preparing the microporous polyolefin membrane modified by the aqueous polymer according to claim 7, characterized in that not less than 3 parts of auxiliaries by weight is also added after adding the hydrophilic monomer in step a, said auxiliaries being selected from the group consisting of dodecyl sulfonate, dodecyl benzene sulfonate and vinyl sulfonate.

19. A device from the group consisting of lithium-ion batteries, super capacitors and battery/super capacitor energy storage devices, said device including as a non-aqueous electrolyte membrane the microporous polyolefin membrane modified by the aqueous polymer according to claim 1.

20. A device from the group consisting of lithium-ion batteries, super capacitors and battery/super capacitor energy storage devices, said device including as a non-aqueous electrolyte membrane the microporous polyolefin membrane modified by the aqueous polymer obtained by the method of claim 7.

* * * * *